US012151812B2

(12) United States Patent
Lacko (10) Patent No.: US 12,151,812 B2
(45) Date of Patent: Nov. 26, 2024

(54) RESIN PRESSURE MOLDED AEROSTRUCTURE WITH INTEGRATED METAL COUPLING

(71) Applicant: ROHR, INC., Chula Vista, CA (US)

(72) Inventor: Anthony J. Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 186 days.

(21) Appl. No.: 17/591,095

(22) Filed: Feb. 2, 2022

(65) Prior Publication Data
US 2023/0242243 A1    Aug. 3, 2023

(51) Int. Cl.
| B64C 9/00 | (2006.01) |
| B29C 70/48 | (2006.01) |
| B64F 5/10 | (2017.01) |
| B29K 307/04 | (2006.01) |
| B29L 31/30 | (2006.01) |

(52) U.S. Cl.
CPC ............... *B64C 9/00* (2013.01); *B29C 70/48* (2013.01); *B64F 5/10* (2017.01); *B29K 2307/04* (2013.01); *B29L 2031/3076* (2013.01); *B64C 2009/005* (2013.01)

(58) Field of Classification Search
CPC .... B64C 9/00; B64C 9/02; B64C 5/06; B64C 3/185; B64C 3/20; B64C 3/24; B64C 2009/005
See application file for complete search history.

(56) References Cited

U.S. PATENT DOCUMENTS

| 2,696,956 A | * | 12/1954 | Farr | ......................... B64C 13/30 |
| | | | | 244/230 |
| 2,999,658 A | * | 9/1961 | Pavlecka | .................. B64C 3/26 |
| | | | | 244/124 |
| 3,883,093 A | * | 5/1975 | Violleau | ................... B64C 9/02 |
| | | | | 428/116 |
| 4,498,647 A | * | 2/1985 | Boehringer | ............... B64C 9/02 |
| | | | | 244/99.3 |

(Continued)

FOREIGN PATENT DOCUMENTS

FR    2459381    1/1981

OTHER PUBLICATIONS

European Patent Office, European Search Report dated Jun. 6, 2023 in Application No. 23153145.0.

*Primary Examiner* — Michael H Wang
(74) *Attorney, Agent, or Firm* — SNELL & WILMER L.L.P.

(57) ABSTRACT

An aerostructure assembly that includes an aerostructure (e.g., a resin pressure molded structure) and a coupling assembly is disclosed. The aerostructure includes an outer shell and a female receiver located within an interior of the outer shell. The coupling assembly includes a coupling and a beam that extends from this coupling. The beam is disposed within the female receiver, including where at least part of the coupling is positioned beyond an open end of the outer shell. The shape of the female receiver may retain the aerostructure to the beam in at least one direction/dimension. One or more fasteners may be utilized to attach the aerostructure to the beam. The coupling may be formed from one or more metals, and in any case, accommodates attachment of the aerostructure assembly to a flight vehicle.

20 Claims, 7 Drawing Sheets

(56) References Cited

U.S. PATENT DOCUMENTS

| | | | | |
|---|---|---|---|---|
| 5,688,426 | A * | 11/1997 | Kirkwood | B29C 66/721 |
| | | | | 219/618 |
| 5,939,007 | A * | 8/1999 | Iszczyszyn | B29C 70/446 |
| | | | | 264/258 |
| 6,454,207 | B1 * | 9/2002 | Yamakawa | B64C 27/615 |
| | | | | 244/99.11 |
| 6,719,870 | B2 | 4/2004 | Ludin et al. | |
| 2002/0074083 | A1 * | 6/2002 | Ludin | B29C 70/48 |
| | | | | 156/293 |
| 2003/0192990 | A1 * | 10/2003 | Simpson | B29C 70/546 |
| | | | | 244/123.7 |
| 2004/0145080 | A1 * | 7/2004 | Tanaka | B29C 70/443 |
| | | | | 264/258 |
| 2008/0277524 | A1 | 11/2008 | Brock | |
| 2011/0135487 | A1 * | 6/2011 | Rao | F03D 1/0641 |
| | | | | 29/889.71 |
| 2014/0103160 | A1 | 4/2014 | Jareno Diz Lois | |
| 2014/0154458 | A1 | 6/2014 | Zilberman et al. | |
| 2014/0209737 | A1 * | 7/2014 | Cook | B64C 9/18 |
| | | | | 244/1 N |
| 2016/0355254 | A1 | 12/2016 | Witte et al. | |
| 2017/0050723 | A1 | 2/2017 | Witte et al. | |
| 2018/0117841 | A1 * | 5/2018 | Tyler | B29C 70/382 |
| 2019/0300149 | A1 * | 10/2019 | Kordel | B64C 9/02 |
| 2021/0062848 | A1 * | 3/2021 | Gruner | B64C 9/16 |

* cited by examiner

RESIN PRESSURE MOLDED AEROSTRUCTURE WITH INTEGRATED METAL COUPLING

FIELD

The present disclosure generally relates to the field of aerostructures and, more particularly, to the attachment of a resin pressure molded aerostructure to a flight vehicle such as an aircraft.

BACKGROUND

An aircraft may include several control surfaces configured to affect the yaw, roll and pitch of the aircraft during flight. Such control surfaces may include, for example, ailerons to affect the roll about a longitudinal axis, a rudder to affect the yaw about a vertical axis and an elevator to affect the pitch about a lateral axis, each axis being with respect to a coordinate system fixed to the aircraft. Additional control surfaces include trailing edge flaps configured to affect the lift of a wing, leading edge slats configured to affect the stall speed of a wing and spoilers, generally located adjacent to and forward of the trailing edge flaps and configured to disrupt the airflow over a wing surface to reduce lift or to increase drag. Control surfaces are typically airfoil-like components configured to alter the flow of air about the wings or tail structure of the aircraft. As such, an individual control surface is generally simple in shape, having one or more of a leading edge, a trailing edge, a pressure side and a suction side. Notwithstanding the simple shape, a control surface or the airfoil-like component thereof, must possess sufficient structural integrity to withstand the forces applied to it during use over the operational life of the aircraft. Control surfaces exhibiting low weight and high strength may be fabricated using hollow airfoil-like bodies having stringers and solid material sections positioned where the aerodynamic forces tend to present maximal loads.

Resin Pressure Molding (RPM) may be used to form complex 3D structures from composite materials. These structures usually contain little to no fasteners (smooth). They also offer high strength and stiffness to weight ratio assemblies. These properties are ideal for air vehicle control surfaces. However, the interface between at least some control surfaces and the vehicle can be subject to high wear and can experience high loads. Therefore, a need exists to efficiently attach the control surface structure to the air vehicle interface without sacrificing the weight or strength benefits of the composite material, nor the aerodynamically smooth properties of the RPM technology.

SUMMARY

An aerostructure assembly is presented herein. Both the configuration of such an aerostructure assembly and the fabrication of such an aerostructure assembly are within the scope of this Summary.

One aspect is embodied by an aerostructure assembly that includes an aerostructure and a coupling assembly. The aerostructure includes an outer shell, a first female receiver that is disposed within an interior of this outer shell (e.g., in spaced relation to the outer shell), and a plurality of supports that extend between the outer shell and the first female receiver. The aerostructure is an integral resinous structure (e.g., a homogeneous carbon fiber resin structure; the aerostructure being of one-piece construction) with integral supports (e.g., the outer shell, the first female receiver, and the plurality of supports being an integral structure). The coupling assembly includes a first beam that extends from a coupling, into the outer shell of the aerostructure, and into the first female receiver of the aerostructure. At least one fastener is used to attach the aerostructure to the first beam.

The above-noted aerostructure may include an opening on an exterior of the outer shell, for instance at a first end of the aerostructure, and with the beam of the coupling assembly extending through this opening and into the first female receiver. The opening may correspond with an entirety of the noted first end of the aerostructure, or may correspond with only a portion of this first end. At least part of the coupling may be positioned beyond the outer shell, and in any case may be used to mount the aerostructure assembly to another structure, such as a flight vehicle (e.g., a manned or unmanned flight vehicle, including without limitation an aircraft). The first female receiver may be characterized as retaining the coupling assembly in at least one dimension/direction, and including in two different dimensions/directions.

Another aspect is embodied by a method of fabricating an aerostructure assembly. An aerostructure may be fabricated by a resin pressure molding operation/process. The aerostructure includes an outer shell, a first female receiver that is disposed within an interior of this outer shell (e.g., in spaced relation to the outer shell), and a plurality of supports that extend between the outer shell and the first female receiver. A first beam of a coupling assembly is directed into the outer shell of the aerostructure and into the first female receiver. The aerostructure may be fastened to the first beam.

The aerostructure may be of any appropriate size, shape, and/or configuration and may provide any appropriate functionality. For instance, the aerostructure may incorporate one or more control surfaces, for instance where the aerostructure assembly is movably interconnected with another structure (e.g., a flight vehicle such as a manned or unmanned flight vehicle and including without limitation an aircraft). The aerostructure may incorporate one or more aerodynamic surfaces, for instance where the aerostructure assembly is mounted in fixed relation to another structure (e.g., a flight vehicle such as a manned or unmanned flight vehicle and including without limitation an aircraft). The coupling may be mounted in any appropriate manner to a flight vehicle.

Various aspects of the present disclosure are also addressed by the following examples and in the noted combinations:

1. An aerostructure assembly, comprising:
    an aerostructure comprising an outer shell, a first female receiver disposed within an interior of said outer shell, and a plurality of first supports extending between said outer shell and said first female receiver, wherein said aerostructure is an integral structure and comprises resin;
    a coupling assembly comprising a coupling and a first beam, said first beam extending from said coupling, into said outer shell of said aerostructure, and into said first female receiver of said aerostructure; and
    at least one first fastener that extends through said outer shell and at least into said first beam.
2. The aerostructure assembly of example 1, wherein said aerostructure is a resin pressure molded structure.
3. The aerostructure assembly of any of examples 1-2, wherein said outer shell comprises a control surface.
4. The aerostructure assembly of any of examples 1-3, wherein said outer shell comprises an aerodynamic surface.

5. The aerostructure assembly of any of examples 1-4, wherein said outer shell, said first female receiver, and each first support of said plurality of first supports are of a common length.
6. The aerostructure assembly of any of examples 1-5, wherein said aerostructure is selected from the group consisting essentially of a rudder, an elevator, an aileron, a fin, a wing tip, a flap, a slat, spoilers, trim tabs, stabilizers, and external antennae.
7. The aerostructure assembly of any of examples 1-6, wherein said first female receiver and said first beam are complementary-shaped.
8. The aerostructure assembly of any of examples 1-6, wherein an outer perimeter of said first beam and an inner perimeter of said first female receiver are complementary-shaped.
9. The aerostructure assembly of any of examples 1-8, wherein an entirety of an outer surface of said first beam is disposed in interfacing relation with an inner surface of said first female receiver.
10. The aerostructure assembly of any of examples 1-9, wherein said first beam is of a dovetail cross-sectional configuration taken perpendicular to a length dimension of said first beam.
11. The aerostructure assembly of any of examples 1-10, wherein at least part of said coupling is positioned beyond said aerostructure.
12. The aerostructure assembly of any of examples 1-11, wherein said coupling comprises first and second coupling ends, wherein said aerostructure is disposed at said second coupling end, wherein said first coupling end is spaced from each of said aerostructure and said second coupling end, and wherein said first beam extends from said second coupling end.
13. The aerostructure assembly of any of examples 1-12, wherein said coupling assembly is an integral structure.
14. The aerostructure assembly of any of examples 1-13, wherein said outer shell has a matching profile with an entirety of an outer perimeter of said coupling that is positioned beyond said outer shell.
15. The aerostructure assembly of any of examples 1-14, wherein each of said coupling and said first beam comprises at least one metal.
16. The aerostructure assembly of any of examples 1-15, wherein said aerostructure further comprises an open space within said interior of said outer shell between each adjacent pair of first supports of said plurality of first supports.
17. The aerostructure assembly of example 16, further comprising:
    a filler material within each said open space of said aerostructure.
18. The aerostructure assembly of any of examples 1-17:
    wherein said aerostructure further comprises a second female receiver disposed within said interior of said outer shell and a plurality of second supports extending between said outer shell and said second female receiver;
    said coupling assembly further comprising a second beam, said second beam extending from said coupling, into said outer shell of said aerostructure, and into said second female receiver of said aerostructure; and
    said aerostructure assembly further comprising at least one second fastener that extends through said outer shell and at least into said second beam.
19. The aerostructure assembly of example 18, wherein said first beam and said second beam are at least one of different sizes and different lengths.
20. The aerostructure assembly of any of examples 18-19, wherein said first beam and said second beam are spaced from and disposed parallel to one another.
21. The aerostructure of any of examples 1-20, wherein said aerostructure further comprises an opening at a first end of said aerostructure, wherein said outer shell extends from said first end in a first dimension, and wherein said first beam extends through said opening and into said first female receiver.
22. A flight vehicle comprising a first component and the aerostructure assembly of any of examples 1-21, wherein said first component is interconnected with said aerostructure assembly through said coupling.
23. A method of fabricating an aerostructure assembly, comprising:
    resin pressure molding an aerostructure comprising an outer shell, a first female receiver disposed within an interior of said outer shell, and a plurality of first supports extending between said outer shell and said first female receiver;
    directing a first beam of a coupling assembly into said outer shell of said aerostructure and into said first female receiver of said aerostructure; and
    fastening said outer shell to said first beam.
24. The method of example 23, wherein at least part of a coupling of said coupling assembly is positioned beyond said aerostructure after said fastening step.
25. The method of example 24, wherein the aerostructure assembly of example 24 is the aerostructure assembly of any of examples 1-21.
26. The method of any of examples 23-25, wherein said directing a first beam step comprises sliding said first beam along a length of said first female receiver while an outer surface of said first beam is disposed in interfacing relation with an inner surface of said first female receiver.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

The various embodiments addressed herein each may be characterized as being in the form of an "aerostructure". The term "aerostructure", as used in this disclosure, means a unit, component, section, or any portion or combination of portions of an aircraft or other vehicle that is capable of flight, where "vehicle" includes any structure that is used to transport one or more payloads of any appropriate type (e.g., cargo, personnel) and including without limitation manned or unmanned flight vehicles such as an aircraft. Representative aircraft in accordance with the foregoing includes without limitation airplanes, unmanned arial vehicles, helicopters, and the like. An aerostructure in accordance with this disclosure may be in the form of a rudder, elevator, aileron, fin, wing tip, flap, slat, spoiler, trim tab, stabilizer, or external antennae for a flight vehicle, as appropriate.

Figure 1A:
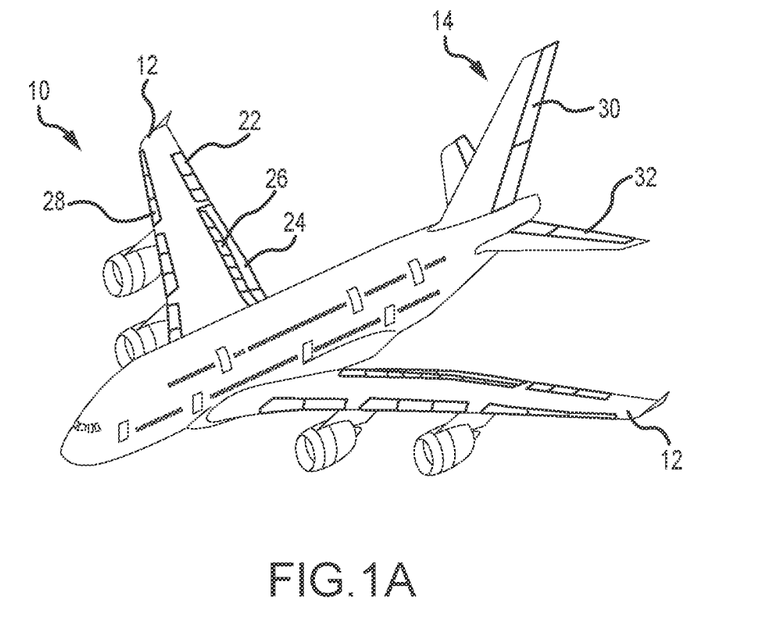
FIG. 1A is a perspective view of an aircraft having a variety of control surfaces distributed about the wings and tail structure, in accordance with various embodiments.
Figure 1B:
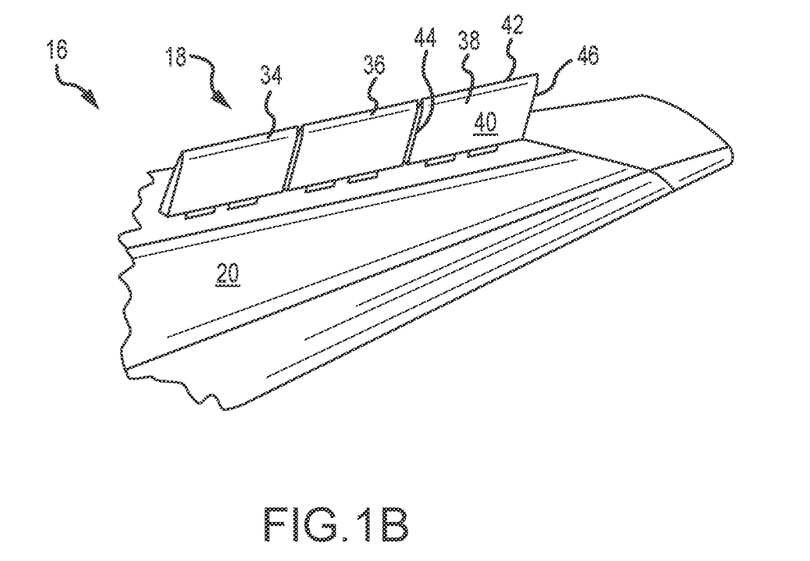
FIG. 1B is a perspective view of an aircraft wing having spoilers illustrated in a deployed position, in accordance with various embodiments.

FIG. 1A illustrates an aircraft 10 having a variety of control surfaces disposed about the wings 12 and the tail section 14 of the aircraft, while FIG. 1B illustrates a wing 16 having a plurality of spoilers 18 disposed along an upper surface 20 of the wing 16, with each of the plurality of spoilers 18 illustrated in a deployed position. Referring specifically to FIG. 1A, the variety of control surfaces typically used on the wings 12 of the aircraft 10 may include, for example, an aileron 22, a trailing edge flap 24, a spoiler 26, disposed adjacent to and forward of the trailing edge flap 24, and a leading edge slat 28. Similarly, the variety of control surfaces typically used on the tail section 14 of the aircraft 10 may include, for example, a rudder 30 and an elevator 32. While the foregoing description of the variety of control surfaces generally refers to each control surface as a single component, it will be appreciated that, in various embodiments, each individual component, e.g., the spoiler 26, may be a single component within a plurality of like components, e.g., the plurality of spoilers 18, as illustrated in FIG. 1B. For example, with reference to FIG. 1B, the plurality of spoilers 18 may, in various embodiments, include a first spoiler 34, a second spoiler 36 and a third spoiler 38. In various embodiments, each one of the plurality of spoilers 18 includes an upper surface 40 and a lower surface opposite the upper surface 40, a trailing edge 42, and an inboard end 44 (or a first end) and an outboard end 46 (or a second end).

Figure 2:
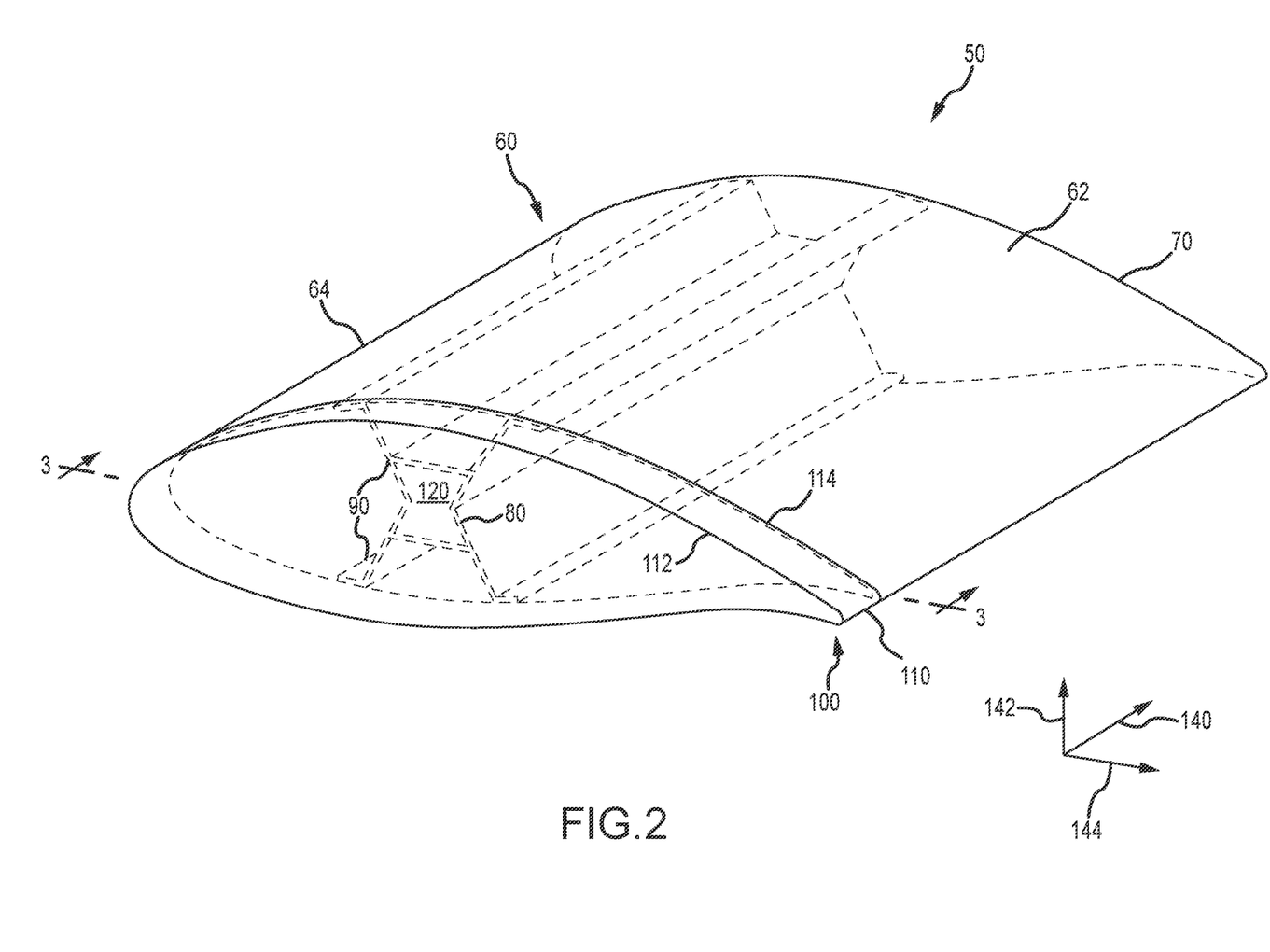
FIG. 2 is a perspective view of an aerostructure assembly, in accordance with various embodiments.
Figure 3:
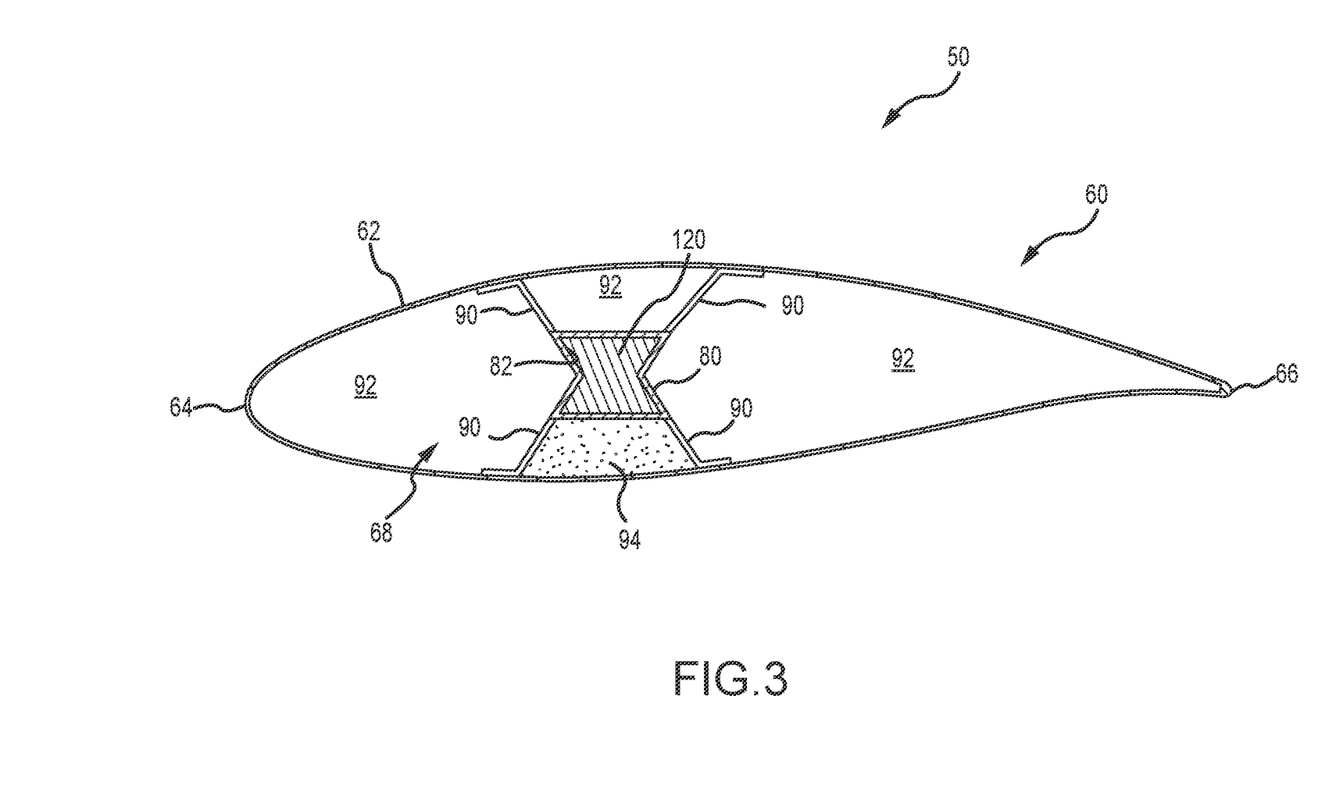
FIG. 3 is a cross-sectional view of the aerostructure assembly of FIG. 2, taken along line 3-3, in accordance with various embodiments.
Figure 4:
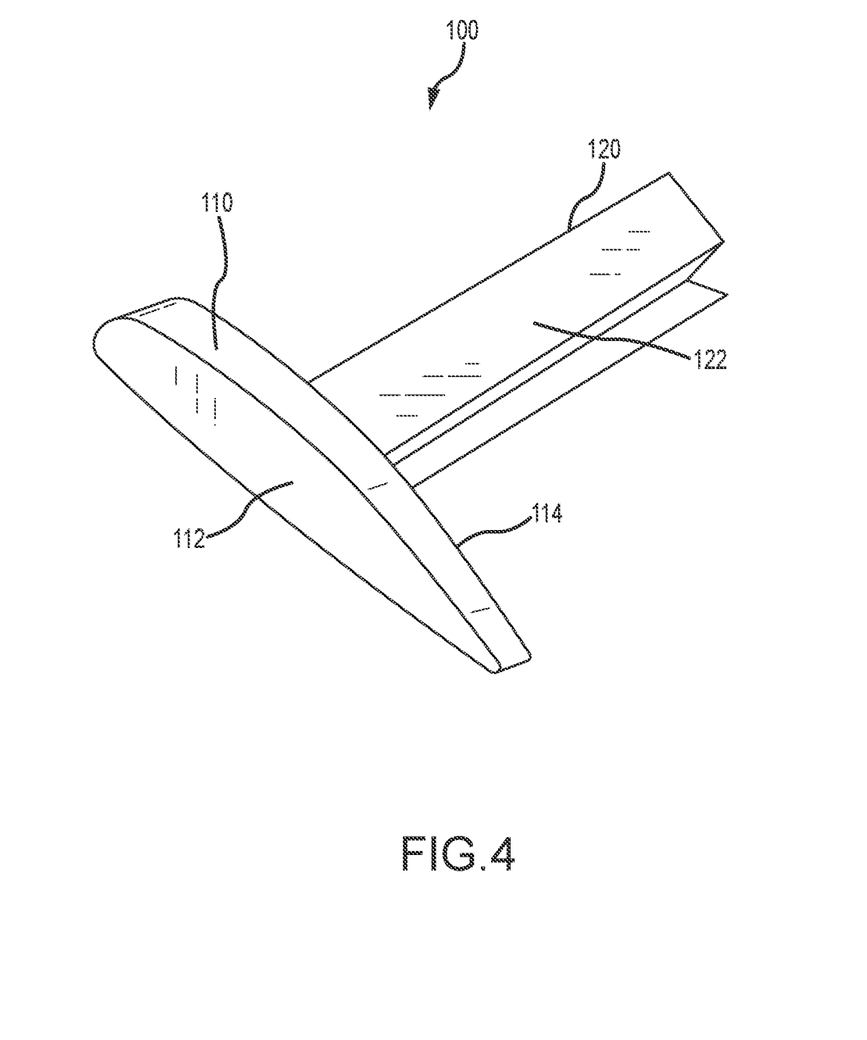
FIG. 4 is a perspective view of a coupling assembly used by the aerostructure assembly of FIG. 2, in accordance with various embodiments.

An aerostructure assembly is illustrated in FIGS. 2-4 and is identified by reference numeral 50. The aerostructure assembly 50 includes an aerostructure 60 and a coupling assembly 100. The aerostructure 60 may incorporate one or more control surfaces for a flight vehicle (typically movable relative to the flight vehicle), or could incorporate one or more aerodynamic surfaces for a flight vehicle (e.g., a stationary surface relative to the flight vehicle). Representative control surface applications for the aerostructure 60 include without limitation rudders, elevators, ailerons, fins, wing tips, flaps, slats, spoilers, trim tabs, stabilizers, and the like. Representative aerodynamic surface applications for the aerostructure 60 include without limitation a wing tip and external antennae. For at least certain applications the aerostructure 60 may be characterized as an airfoil or an airfoil-like structure.

The aerostructure 60 may be in the form of a resin pressure molded part (e.g., an integral composite structure; a net-shape composite part). "Integral" means the aerostructure 60 is of a one-piece configuration—adjacent portions/components of the aerostructure 60 are not separately formed and are not separately attached together. Stated another way, no fasteners are utilized to define the aerostructure 60 itself. The aerostructure 60 may also be characterized as being monolithic or as a monolithic part.

Resin pressure molding (RPM) is a closed-molding process that includes delivering a liquid resin into a closed mold in which some, or all, of the fiber reinforcement has been pre-impregnated with a resin (e.g., via one or more pre-preg sheets of resin/fibers (e.g., carbon fibers) being positioned in the mold prior to its closure. The mold may include one or more mandrels to accommodate defining one or more open spaces within the article being formed (e.g., the aerostructure 60). A combination of elevated heat and hydrostatic resin pressure may be applied to the mold to cure the article being formed.

The aerostructure 60 includes an outer shell 62 (e.g., which may have a leading edge 64, a trailing edge 66, a first end 68 having at least one opening (including where the entirety of the first end 68 is open), and a closed end 70; note that the cross-section of FIG. 3 is taken where the outer shell 62 contacts a second coupling end 114 of a coupling 110 of a coupling assembly 100, discussed below). The first end 68 and the closed end 70 are spaced along a first dimension 140 (e.g., a "z" dimension). A female receiver 80 is disposed within an interior of the outer shell 62 and is spaced from the outer shell 62. A plurality of first supports 90 extend between the outer shell 62 and an outer perimeter of the female receiver 80. One or more of the female receiver 80 and the first supports 90 may extend from the first end 68 to the closed end 70 of the outer shell 70. However, one or more of the following may be applicable to the female receiver 80: 1) the female receiver 80 could be recessed relative to the first end 68 (spaced from the first end 68 in the direction of the closed end 70); and/or 2) the female receiver 80 could terminate prior to reaching the closed end 70 (e.g., an end of the female receiver 80 closest to the closed end 70 could be spaced from the closed end 70). Each of the first supports 90 may have a common length dimension (in the first dimension 140) in relation to the length dimension of the female receiver 80 (e.g., each support 90 may extend along an entire length of the female receiver 80 in the first dimension 140).

An open space or void 92 may exist between each adjacent pair of first supports 90. Optionally, foam or another material or combination of materials could be disposed in one or more of the open spaces 92 (such a material(s) within the open spaces 92 not being defined by the resin pressure molding process that defines the aerostructure 60, for instance filler material 94 shown in one of the open spaces of FIG. 3). This void can be filled as a secondary process to the RPM process or as a "fly-away tool" applied concurrently to the RPM process.

The coupling assembly 100 is separately formed from the aerostructure 60, such that the coupling assembly 100 and the aerostructure 60 are separate "parts" or "components". The coupling assembly 100 includes a coupling 110 having a first coupling end 112 and a second coupling end 114 that are spaced along the first dimension 140. A beam 120 of the coupling assembly 100 extends from the second coupling end 114 in the first dimension 140. The coupling 110 and the beam 120 may be integrally formed such that the coupling assembly 100 is of an integral configuration or structure. Each of the coupling 110 and beam 120 may be formed from one or more metals, one or more metal alloys, or any combination thereof.

The beam 120 of the coupling assembly 100 is disposed within the female receiver 80 of the aerostructure 60 in an assembled/installed configuration for the aerostructure assembly 50. An outer perimeter or surface 122 of the beam 120 and an inner perimeter/surface 82 of the female receiver 80 may be of a complementary shape (e.g., an entirety of the outer perimeter 122 of the beam 120 may be disposed in interfacing relation with the inner perimeter 82 of the female receiver 80). FIG. 3 shows the beam 120 as having a dovetail-type profile/configuration (viewed perpendicularly to the first dimension 140 in which the beam 120 extends). Other configurations for the beam 120 could be utilized for the aerostructure assembly 50, such as C-shaped, T-shaped, I-shaped, square-shaped, triangularly-shaped, and the like.

The aerostructure assembly 50 may be assembled by sliding the aerostructure 60 onto the beam 120 such that the beam 120 is directed into the female receiver 80 of the aerostructure 60 and including where the first end 68 of the aerostructure 60 abuts the second coupling end 114 (e.g., the entirety of the coupling 110 may be disposed outside/beyond the aerostructure 60). However, a portion of the coupling 110 could be disposed within the interior of the outer shell 62, including where such a portion is disposed in interfacing relation with an inner surface of an end portion of the outer shell 62.

An outer perimeter of the coupling 110 that is positioned beyond the outer shell 62, and an adjacent portion of an outer perimeter of the outer shell 62 of the aerostructure 60, may have a matching profile/shape (e.g., to in effect define a continuous surface) for an exterior of the aerostructure assembly 50. One or more fasteners 124 (FIG. 5A) may be directed through the outer shell 62 and into the beam 120 to secure the coupling assembly 100 relative to the outer shell 62 in the first dimension 140. Based upon the above-noted interface between the beam 120 and the female receiver 80, and in conjunction with the noted fastener(s) 124, the coupling assembly 100 will be retained relative to the aerostructure 60 in at least three dimensions/directions (and including within the first dimension 140, a second dimension 142 (e.g., a "y" dimension), and a third dimension 144 (e.g., an "x" dimension) and including in all dimensions/directions. The above-noted interface between the beam 120 and the female receiver 80 itself may retain the aerostructure 60 relative to the coupling assembly 100 in each of the second dimension 142 and the third dimension 144, while the one or more fasteners 124 may retain the aerostructure 60 relative to the coupling assembly 100 in the first dimension 140.

Figure 5A:
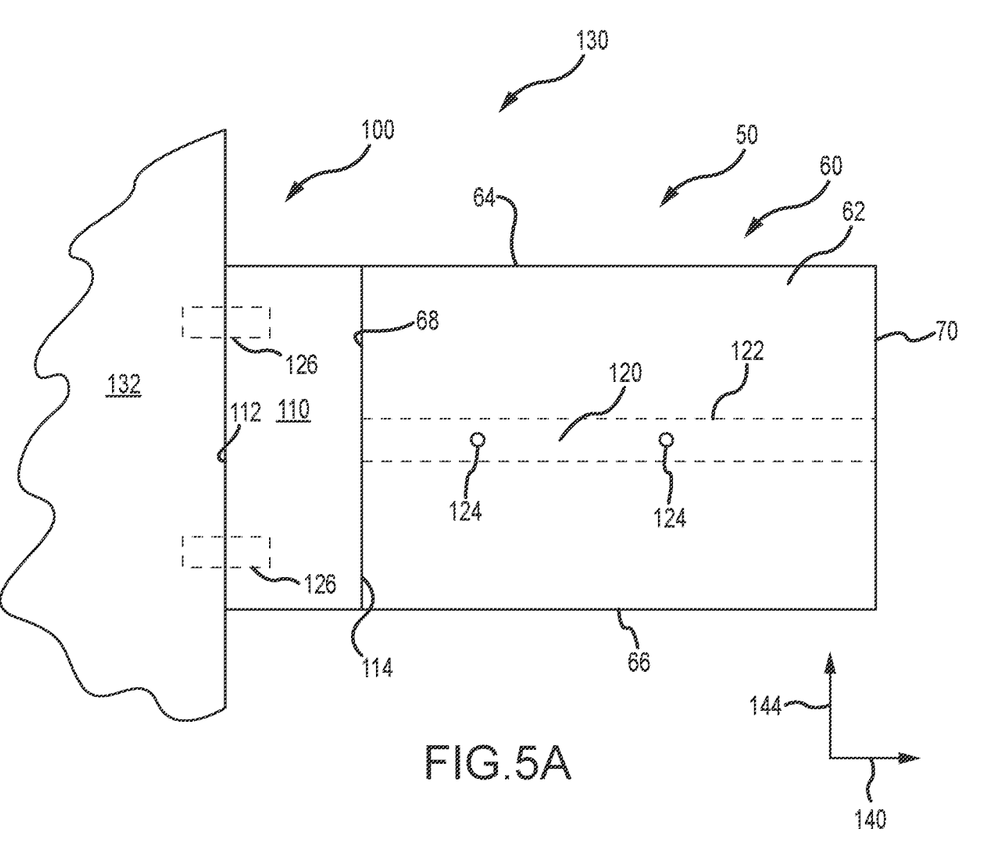
FIG. 5A is a schematic of the aerostructure assembly of FIG. 2 mounted to a first component, in accordance with various embodiments.

FIG. 5A presents a flight vehicle 130 that incorporates the aerostructure assembly 50. Although FIG. 5A illustrates that the beam 120 extends from the first end 68 of the aerostructure 62 its closed end 70, such may not be required for all applications (e.g., the beam 120 could terminate at an intermediate location between the first end 68 and the closed end 70 of the aerostructure 60). The coupling 110 accommodates mounting of the aerostructure assembly 50 to the flight vehicle 130. The coupling 110 could be directly mounted to a first component 132 of the flight vehicle 130, or could be indirectly mounted to such a first component 132 (e.g., via one or more intermediate structures). For instance, one or more fasteners 126 could be used for this mounting (e.g., each fastener 126 being engaged (e.g., threadably) with at least the coupling 110 and the first component 132).

Figure 5B:
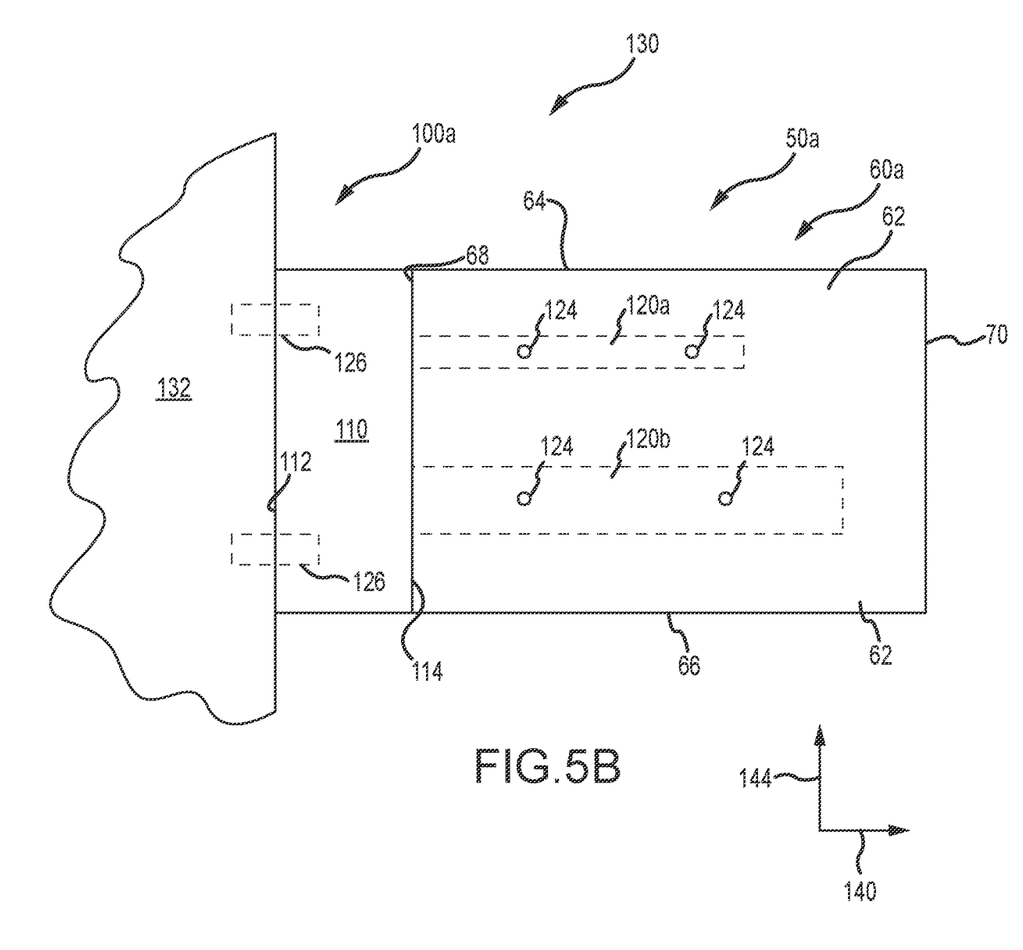
FIG. 5B is a schematic of a variation of the aerostructure assembly of FIG. 2 mounted to a first component, in accordance with various embodiments.

A variation of an aerostructure assembly at least generally in accordance with the foregoing is presented in FIG. 5B and is identified by reference numeral 50a. Corresponding components between the aerostructure assembly 50 and the aerostructure assembly 50a of FIG. 5B are identified by the same reference numerals. Unless otherwise noted herein to the contrary, the discussion presented above applies to the corresponding components of the aerostructure assembly 50a. The aerostructure assembly 50a is mounted to the flight vehicle 130 in the same manner as the aerostructure assembly 50 (e.g., via the coupling 100a).

The aerostructure assembly 50a includes an aerostructure 60a having a pair of female receivers (e.g., each being in accord with the female receiver 80), with each such female receiver being interconnected with the outer shell 62 by a plurality of supports (e.g., in accord with the first supports 90) to accommodate the coupling assembly 100a having a first beam 120a and a second beam 120b. The beams 120a, 120b are spaced in the third dimension 144 and may be disposed in parallel relation to each other. The aerostructure 60a may be attached to the coupling assembly 100a using at least one fastener 124 for each of the first beam 120a and the second beam 120b. The first beam 120a and the second beam 120b may be of a common cross-sectional configuration or may utilize different cross-sectional configurations, may be different lengths (as shown in FIG. 5B) or of a common length, may be of different sizes (as shown in FIG. 5B) or may be of a common size, or any combination thereof. Each of the beams 120a, 120b may extend from the first end 68 of the aerostructure 60a toward, but not to, the closed end 70 (as shown in FIG. 5B) or may extend the entire distance between the first end 68 and closed end 70 of the aerostructure 60a. It should be appreciated that the coupling assembly 100a could include more than two beams, with the aerostructure 60a then have a corresponding number of female receivers.

Figure 6:
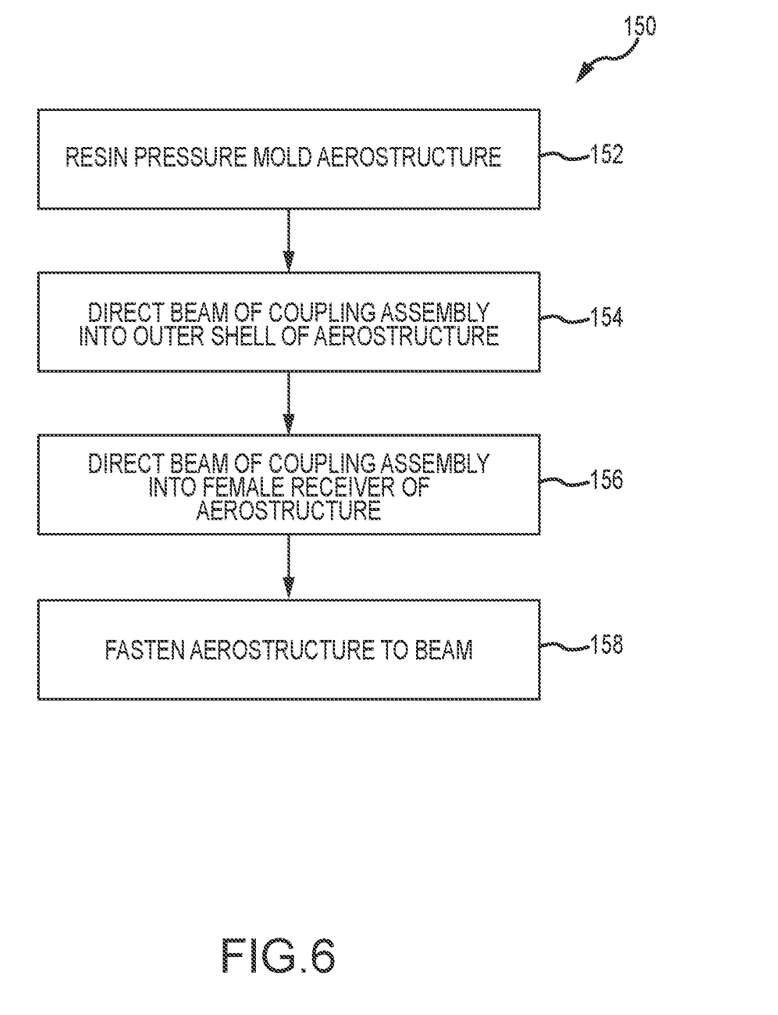
FIG. 6 is a flowchart of a method for fabricating an aerostructure assembly, in accordance with various embodiments.

A protocol/method for fabricating an aerostructure assembly is presented in FIG. 6 and is identified by reference numeral 150. An aerostructure is fabricated using a resin pressure molding process (152). One or more beams of a coupling assembly is directed into an outer shell of the aerostructure, for instance through a corresponding opening on an exterior of the aerostructure (154). Each such beam may also be directed into a corresponding female receiver of the aerostructure (156), including where this corresponding female receiver is spaced from the outer shell. Optionally, at least part of a coupling of the coupling assembly may be positioned outside/extend beyond the aerostructure. In any case, the aerostructure may be mounted to the coupling assembly, for instance by directing one or more fasteners through the outer shell of the aerostructure and at least into one or more beams of the coupling assembly (158).

This present disclosure enables the benefits of RPM structures to be realized for situations where a metallic interface fitting is required. For a control surface this would a smooth aerodynamic outer surface with no fasteners, and a lightweight stiff composite structure. There is potentially a cost benefit to using an out of autoclave process as well.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aerostructure assembly, comprising:
    an aerostructure comprising an outer shell having a first end and a closed end spaced from the first end along a first dimension, a first female receiver disposed within an interior of the outer shell, spaced from the outer shell, and extending from the first end to the closed end of the outer shell, and a plurality of first supports extending between the outer shell and an outer perimeter of the first female receiver, wherein the aerostructure is an integral structure and comprises resin;
    a coupling assembly comprising a coupling having a first coupling end and a second coupling end that are spaced along the first dimension and a first beam, the first beam extending from the second coupling end in the first dimension, into the outer shell of the aerostructure, and into the first female receiver of the aerostructure, wherein an outer perimeter of the beam and an inner perimeter of the female receiver are of complementary shape such that an entirety of the outer perimeter of the beam is disposed in interfacing relation with the inner perimeter of the female receiver; and
    at least one first fastener that extends through the outer shell and at least into the first beam.

2. The aerostructure assembly of claim 1, wherein the aerostructure is a resin pressure molded structure.

3. The aerostructure assembly of claim 1, wherein the outer shell comprises at least one of a control surface or an aerodynamic surface.

4. The aerostructure assembly of claim 1, wherein the outer shell, the first female receiver, and each first support of the plurality of first supports are of a common length.

5. The aerostructure assembly of claim 1, wherein the aerostructure is selected from the group consisting essentially of a rudder, an elevator, an aileron, a fin, a wing tip, a flap, a slat, spoilers, trim tabs, stabilizers, and external antennae.

6. The aerostructure assembly of claim 1, wherein the outer perimeter of the first beam and an inner perimeter of the first female receiver are complementary-shaped.

7. The aerostructure assembly of claim 1, wherein an entirety of an outer surface of the first beam is disposed in interfacing relation with an inner surface of the first female receiver.

8. The aerostructure assembly of claim 1, wherein at least part of the coupling is disposed beyond the aerostructure.

9. The aerostructure assembly of claim 1, wherein the coupling assembly is an integral structure.

10. The aerostructure assembly of claim 1, wherein the outer shell has a matching profile with an entirety of an outer perimeter of the coupling that is disposed beyond the outer shell.

11. The aerostructure assembly of claim 1, wherein each of the coupling and the first beam comprises at least one metal.

12. The aerostructure assembly of claim 1, wherein the aerostructure further comprises an open space within the interior of the outer shell between each adjacent pair of first supports of the plurality of first supports.

13. The aerostructure assembly of claim 12, further comprising:
a filler material within each open space of the aerostructure.

14. The aerostructure assembly of claim 1:
wherein the aerostructure further comprises a second female receiver disposed within the interior of the outer shell and a plurality of second supports extending between the outer shell and the second female receiver;
the coupling assembly further comprising a second beam, the second beam extending from the coupling, into the outer shell of the aerostructure, and into the second female receiver of the aerostructure; and
the aerostructure assembly further comprising at least one second fastener that extends through the outer shell and at least into the second beam.

15. The aerostructure assembly of claim 14, wherein the first beam and the second beam are at least one of different sizes and different lengths.

16. The aerostructure assembly of claim 14, wherein the first beam and the second beam are spaced from and disposed parallel to one another.

17. A flight vehicle comprising a first component and the aerostructure assembly of claim 1, wherein the first component is interconnected with the aerostructure assembly through the coupling.

18. The aerostructure assembly of claim 1, wherein the complementary shape is at least one of a dovetail shaped, C-shaped, T-shaped, I-shaped, square-shaped, or triangularly-shaped.

19. A method of fabricating an aerostructure assembly, comprising:
resin pressure molding an aerostructure comprising an outer shell having a first end and a closed end spaced from the first end along a first dimension, a first female receiver disposed within an interior of the outer shell, spaced from the outer shell, and extending from the first end to the closed end of the outer shell, and a plurality of first supports extending between the outer shell and an outer perimeter of the first female receiver;
directing a first beam of a coupling assembly into the outer shell of the aerostructure and into the first female receiver of the aerostructure, wherein an outer perimeter of the beam and an inner perimeter of the female receiver are of a complementary shape such that an entirety of the outer perimeter of the beam is disposed in interfacing relation with the inner perimeter of the female receiver; and
fastening the outer shell to the first beam.

20. The method of claim 19, wherein the directing a beam step comprises sliding the first beam along a length of the first female receiver while an outer surface of the first beam is disposed in the interfacing relation with an inner surface of the first female receiver.

* * * * *